H. H. M. KAMMERHOFF.
GALVANIC BATTERY.
APPLICATION FILED FEB. 9, 1914.
1,240,856.
Patented Sept. 25, 1917.
2 SHEETS—SHEET 2.
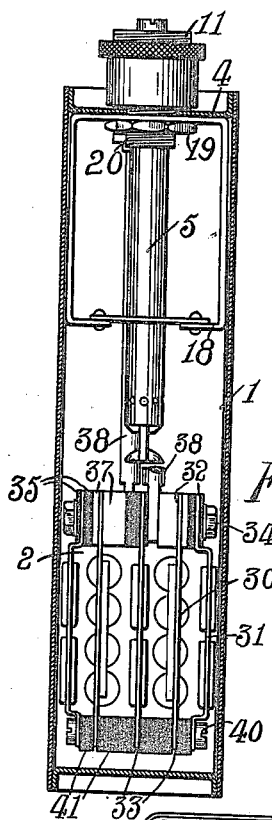
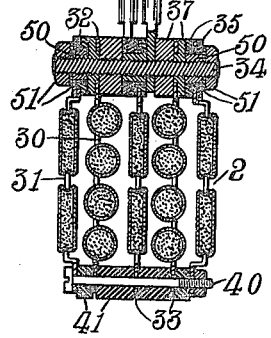
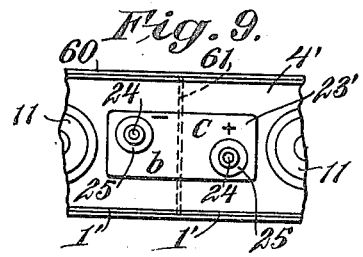
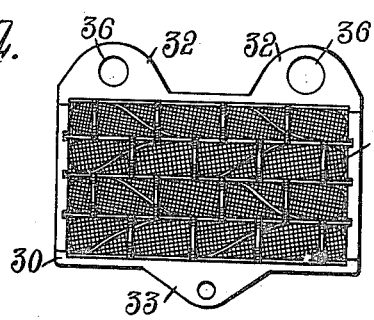
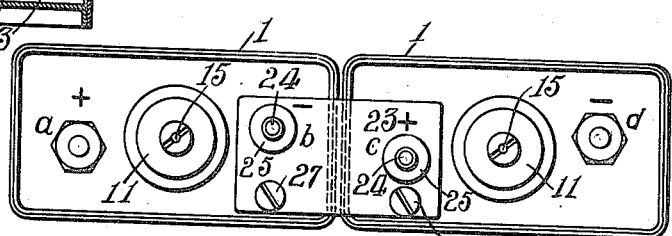
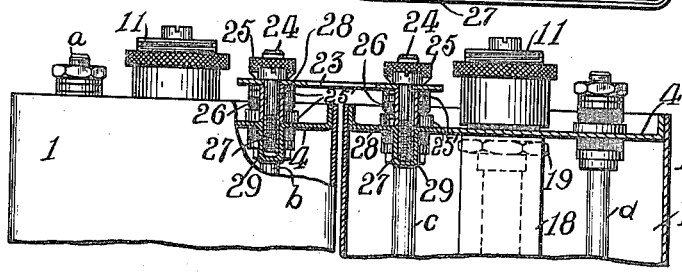

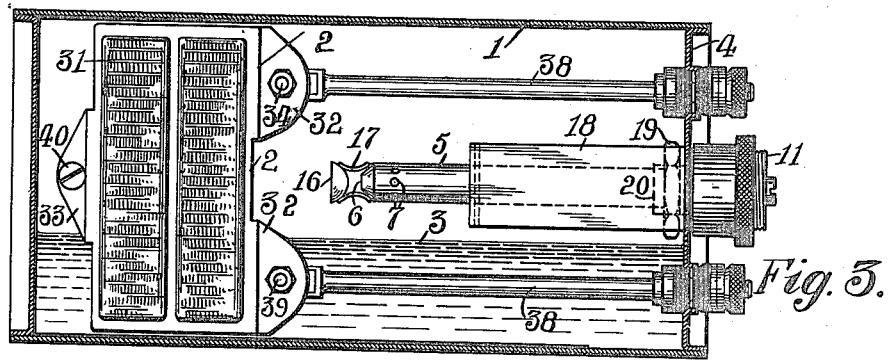

UNITED STATES PATENT OFFICE.

HEINRICH H. MENO KAMMERHOFF, OF ORANGE, NEW JERSEY, ASSIGNOR TO EDISON STORAGE BATTERY COMPANY, OF WEST ORANGE, NEW JERSEY, A CORPORATION OF NEW JERSEY.

GALVANIC BATTERY.

1,240,856.  Specification of Letters Patent.  Patented Sept. 25, 1917.

Application filed February 9, 1914. Serial No. 817,493.

*To all whom it may concern:*

Be it known that I, HEINRICH H. MENO KAMMERHOFF, a subject of the Emperor of Germany, and a resident of Orange, Essex county, New Jersey, have invented certain new and useful Improvements in Galvanic Batteries, of which the following is a description.

My invention relates generally to galvanic batteries and particularly to portable batteries, such for example as storage batteries forming a part of or used to supply current to electric lanterns.

It has been usual in batteries consisting of a pair of cells connected in series and having metallic containers, to maintain the containers insulated from each other and from the battery elements. In such batteries the insulation between the containers is liable to be weakened or destroyed, thereby permitting current to flow in such paths through the cells as to cause electrolytic action at the interior of the containers. One of the objects of my invention is to dispense with the insulation previously used between the cells of such batteries or to employ a two-compartment metallic container and to provide means for preventing electrolytic action of the aforesaid character. I secure this result by connecting together electrically a positive pole of one cell, a negative pole of the other cell and the containers (where two containers are used) or the container (where a two-compartment container is used), thereby maintaining said poles and containers or container at substantially the same potential, and insuring that all electrolytic action shall take place between the elements of the cell. I am thereby enable to increase materially the efficiency and longevity of the battery.

My copending application Serial No. 184,686, filed August 6, 1917, and entitled galvanic batteries, is a division hereof and contains claims covering the improved construction and arrangement described above.

Another object of my invention is to provide a simple and improved form of gas outlet vent, which without the use of valves or similar moving parts can separate or filter the liquids from the gases escaping from the container and automatically return the strained liquids to the container, thus insuring a dry exterior to the battery.

Another object of the invention is to provide a vent of the above indicated character designed to intercept the drops of electrolyte which tend to "creep" along the bore of the vent tube and which flow along the side of the bore of the vent tube during the movement of the container from one position to another and to maintain this liquid out of line of the escaping gas.

A still further object of the invention is to provide an improved arrangement and construction of the electrolyte container and gas vent therefor so as to prevent the escape of electrolyte through the vent from the container irrespective of the position of the latter and to prevent splashing of the electrolyte into the vent tube.

The invention also comprises an improved battery element structure having a horizontal disposition of relatively long battery element members and particularly adapted for use in cells equipped with my improved gas vent tube.

Various other objects and features of my invention will be more fully set forth in the following description in which reference is had to the drawings accompanying and forming a part of this specification, and in which:—

Figures 1 to 3 are longitudinally transverse sectional views, with parts in elevation, taken through a storage battery cell provided with a preferred embodiment of my invention; Fig. 1 showing the cell in its normal, upright position, Fig. 2 showing the cell in inverted position, and Fig. 3 showing the cell in position lying on one of its sides;

Fig. 4 is a vertical transverse sectional view taken on line 4—4 of Fig. 1 looking in the direction indicated by the arrow, the cell being shown without electrolyte;

Fig. 5 is a vertical transverse sectional view through the battery element construction shown in end elevation in Fig. 4;

Fig. 6 is a side elevation of one element of the same;

Fig. 7 is a side elevation of the upper ends of a pair of cells with portions broken away to show details of construction;

Fig. 8 is a plan view of the device shown in Fig. 7, and

Fig. 9 is a fragmentary view similar to Fig. 8 showing a two-compartment container, in the compartments of which the elements of a pair of cells are respectively disposed.

In the drawings, the same reference characters are used to designate corresponding parts in the several views.

Describing one of the cells, there is shown a container 1 of symmetrical form having a plurality of sides or walls, within which container is disposed the battery element construction 2 and a suitable electrolyte 3 preferably having a volume less than one-half the volume of the free space within the container. Extending into the container 1 preferably through the central portion of the head or top 4 thereof, is a vent tube 5, the inner end of which has an opening 6 preferably formed by constricting the bore, which opening is located approximately at the center of volume of the container, said center of volume being a point so located that any plane passed through it would divide the free space of the container, without the electrolyte, into two substantially equal parts. A plurality of gas vents 7 extend through the tube 5 and are spaced from the inner end thereof, whereby a small open ended compartment is formed below the vents. The bore 8 of this tube has its outer end enlarged to form a shoulder 9 preferably positioned exteriorly of the top 4 of the container. Removably disposed within this enlarged portion of the bore 8 is a bell shaped reservoir 10 opening into the bore and supported from the seat provided by the shoulder 9. A cap 11 is threaded into the enlarged portion of the bore and engages an outstanding flange 12 on the reservoir 10 to force the same firmly into engagement with the gasket 13 seated on the shoulder 9. An open-ended tube 14, preferably formed integral with the top wall of the reservoir 10, extends downwardly through the reservoir and places the bore 8 in communication with an outlet 15 in the cap 11. A baffle plate 16, preferably in the form of a segment of a sphere, is attached by means of spaced arms 17 to the inner or lower end of tube 5 with its convex side upwardly disposed and is spaced from the outlet 6 at the inner end of the tube.

The tube 5 passes through the lower side of a substantially rectangular open bracing member 18 suitably fastened to the head or top 4 of the container, preferably by means of the ring 19 which is threaded on a sleeve 20 projecting inwardly from the head or top 4.

The side walls of the member 18 are preferably flat and engage the inner walls of the container on opposite sides of the tube to brace the same from the container as clearly shown in Fig. 4. This bracing member 18 fits within the container and coacts with the structure 2 to resist crushing strains and thus permit the use of thin metal in the construction of these containers. The structure 2 includes positive plates 30 and negative plates 31 interleaved with each other; and each positive plate consists of a frame or grid containing one or more tubular members suitably fastened thereto and containing suitable material such as alternate layers of nickel hydroxid and flake nickel, while each negative plate consists of a frame or grid containing one or more flat pockets suitably secured thereto and containing suitable active material such as electrolytically active finely divided iron or iron oxid; as is more fully described in United States Patent No. 1,073,107, granted on September 16, 1913 to Thomas A. Edison. The tubular members or pockets of the positive plates and the flat pockets of the negative plates are preferably mounted horizontally in their plates or grids, this construction enabling pockets of relatively great length to be employed in the cell, to thereby increase the capacity of the cell, without necessitating the increase of the height of the container or the electrolyte therein. Each frame or grid has a pair of tabs 32 projecting from the top thereof and, in the form shown in Figs. 5 and 6, has a tab 33 projecting from the bottom thereof. The positive plates 30 are mechanically and electrically secured together by means of the bolt 34 passing through one of the tabs 32 of each of the plates and the bolt and positive plates are insulated from the negative plates by suitable insulating sleeves or rings 35 carried by the bolt. The tab 32 of each negative plate, through which the bolt 34 passes, is preferably maintained in position thereon between a pair of such insulating sleeves 35, one of which is provided with a reduced portion engaging the hole 36 in the tab. Each pair of sleeves or rings 35 is preferably mounted on the bolt 34 in spaced relation thereto by means of a metallic nut 50 threaded on the bolt. Nuts and washers 51 on the ends of the bolt 34 serve to secure the parts firmly in assembled position as shown in Fig. 5.

Instead of a direct engagement between the positive plates and their connecting bolt, they may be inserted between metallic washers 37 threaded on the bolt and disposed between the insulating sleeves 35. Similarly the negative plates are connected together and insulated from the positive plates by means of the sleeved bolt 39 passing through the other tab 32 of each of the plates. The terminals 38 are respectively secured to the positive and negative sets of plates in any suitable manner as by mounting them on the bolts 34 and 39 in contact with one of the washers 37 as shown in Fig. 5. All the plates may be held together at their lower end by a bolt 40 passing through the alined lower tabs 33 of the plates and are spaced and insulated from each other by the sleeves 41 carried by the bolt 40. This arrangement is preferable where the construction 2 is suspended from the top of the container as shown.

In operation, the gases which are generated by the battery pass through the vents 7 which act to intercept the liquid contained in the gases, and the intercepted liquid then flows through the open end 6 of the tube back to the body of electrolyte 3, thus permitting the dry gases to travel through the bore 8, tube 14 and outlet 15 to the outside of the container 1. The opening 6 in the bottom of the tube is designed to pass the returning drops of liquid therethrough. Should the flow be abnormally increased during a short period for any reason, the liquid would merely collect in the compartment in the tube 5 below the vents 7, and would therefore not affect the passage of the gases through the vents 7.

The baffle plate 16 tends to prevent any splashing of the electrolyte into the bore 8, but does not prevent the return of any liquid in the bore to the body of electrolyte 3. Should any of the liquid "creep" along the sides of the bore 8 or flow along the same, as when the casing is turned on its side, it will be trapped by the reservoir 10 thus leaving the tube 14 always open to the flow of gas through the bore 8.

From the construction as described, it will be apparent that the vent or valve tube 5 together with the reservoir may be withdrawn from the casing or container 1 as a unit so that the cell may be supplied with electrolyte or constituents thereof through the valve or vent opening, thus insuring a dry condition of the valve when replaced. The vent tube may be readily screwed into position through the brace 18 which engages the tube intermediate its length and firmly braces the same in position without undue strain on the head or top 4 of the container 1. When the parts are assembled the container is fluid tight, except through the vent tube, and the several parts are secured firmly in position so that the device may be turned from one side to another without affecting the relative position of the parts and without the escape of any of the electrolyte. Positioning the outlet opening 6 of the vent tube substantially at the center of volume of the container, with the electrolyte having a volume less than one half of the volume of the free space within the container, permits of the rough usage to which portable batteries are frequently subjected, for the outlet opening 6 will be above the level of the electrolyte in all positions of the container and the leakage of the electrolyte will thus be prevented.

Referring particularly to the disclosures in Figs. 7 and 8, two cells are connected in series by means of a plate 23 of low resistance, which plate connects the pole of one polarity in one of the cells with the pole of opposite polarity in the other cell by means of the terminal binding posts 24 which are drawn into tight engagement with the plate by means of the nuts 25 and washers 25' compressing the interposed resilient washers 26 which act to hold the nuts 25 from unthreading and need not be of insulating material. This plate is also electrically connected to the metallic containers 1, and for this purpose screws 27 extend through the plate and respectively into engagement with the tops or heads 4 of the containers, and preferably into screw-threaded engagement with depressed sockets 29 forming parts of the heads. The screws 27 each extend through a spacing sleeve 28 disposed between the plate 23 and the respective head 4, whereby the plate is maintained in proper position, and twisting or bending of the same, when the binding posts are screwed down on the plate, is prevented.

While the device has been described particularly with relation to two independent cells, it is obvious that when the sides of the cells are brought into physical contact without insulation therebetween, the two casings become in effect a single casing with a dividing partition, or a two-compartment container.

Assuming that the battery is a storage battery and is being charged, and that the poles $a$, $b$, $c$ and $d$ (Fig. 8) are alternately positive and negative in order as indicated, then the current will travel from the positive terminal or pole $a$, through the electrolyte to the negative pole $b$, through the plate 23 to the positive pole $c$, and through the electrolyte in the second container or compartment to the negative terminal pole $d$. When so arranged, should the containers be in electric contact, the current after traversing through the electrolyte in the first compartment, will pass to the pole $b$ disposed in its path rather than travel around this pole to the side of the container, which has the same polarity as the pole, for the electrolyte disposed between the pole $b$ and the adjacent side of the container offers a material resistance to the passage of the current. As the sides of the second container have the same potential as the pole c, there will be no tendency for the current to travel through the contacting sides to this pole. There will thus be eliminated any electrolytic decomposition of the containers which might result from a portion of the current traveling from the sides of the containers to the poles when the containers are in electric contact with each other. Should the battery, as a storage battery, be discharging then the direction of flow of the current will be reversed and current will flow from the positive pole a of the battery.

Thus, by connecting the metallic containers 1 electrically with a positive pole of one cell and a negative pole of the other cell, these poles and the containers are maintained substantially at the same potential and the current, following the path of least resistance, passes through all the poles in the usual order of cells connected in series rather than through the sides of the containers and the portions of the electrolyte adjacent thereto.

Fig. 9 illustrates a two-compartment container which may be employed instead of the separate containers shown in Figs. 7 and 8, and with which the same results may be obtained as described above. Referring to this figure, reference character 60 represents the container which is provided with a central vertical partition 61, dividing the container into two compartments 1', 1'. Reference characters b and c represent the adjacent poles of unlike polarity of the battery elements which are respectively disposed in the compartments 1', 1'. The binding post 24 of each of the poles b and c is preferably directly grounded to the container top 4', and the elements 27, 28 and 29 employed in the construction shown in Figs. 7 and 8, are preferably dispensed with. The cells in the two compartments 1', 1' are connected in series by means of a plate 23' of low resistance which is secured to the binding posts 24, 24 of the poles b and c by means of the nuts 25.

While I have described and shown a preferred embodiment of my invention, many changes may be made therein without departing from the spirit thereof, and I do not, therefore, wish to be limited to the specific structure shown and described.

Having now fully described my invention, what I claim as new and desire to protect by Letters Patent of the United States is as follows:

1. In a galvanic cell, the combination with a container, of a vent tube extending into said container through one side thereof, and tube bracing means extending from said side and engaging said tube intermediate its length, substantially as described.

2. In a galvanic cell, the combination with a container, of a vent tube extending into said container, said tube having its inner end open to the interior of the container and having one or more vents in the side thereof, and a baffle member carried by said tube spaced from and disposed across said open end, substantially as described.

3. In a galvanic cell, the combination with a container having an opening, of a vent tube removably mounted within said opening and extending into said container, said tube having its inner end open to the interior of the container and disposed within the latter, and a baffle member carried by said tube and spaced from and disposed across said open end, substantially as described.

4. In a galvanic cell, the combination with a container having an opening, of a vent tube removably mounted within said opening and extending into said container, and an inverted reservoir adjacent the outer end of said tube, and in communication with the bore thereof, said reservoir having means for permitting the escape of gas to a point beyond the reservoir directly from the bore of the portion of said tube within the container, substantially as described.

5. In a galvanic cell, the combination with a container having an opening, of a vent tube extending into said container through said opening, the outer portion of the bore of said tube being enlarged, an inverted reservoir positioned in the enlarged portion of said bore, the mouth of said reservoir facing the inner smaller portion of said bore, and a gas conducting tube extending through said reservoir and projecting into said inner smaller portion of the bore, substantially as described.

6. In a galvanic cell, the combination with a container, of a vent tube extending into said container and having the outer portion of its bore enlarged, a bell-shaped reservoir positioned in the enlarged portion of said bore and facing the inner portion of the same, a gas conducting tube carried by said reservoir and projecting into said inner portion of the bore, and a closing cap for holding said reservoir removably in place, substantially as described.

7. A gas vent comprising a tube, one portion of the bore of which is enlarged, an inverted reservoir positioned in said enlarged portion so as to be adapted to receive fluid directly from the side of the smaller portion of said bore, and an open ended tube extending through said reservoir and into said smaller portion of said bore, substantially as described.

8. A battery container having oppositely disposed side walls, a bracing member extending between said walls intermediate the ends of the container to resist crushing strains, and a vent tube extending into the container through one wall thereof, said tube being engaged and positioned by said member at a point remote from where it passes through the wall of the container, substantially as described.

This specification signed and witnessed this 6th day of February, 1914.

HEINRICH H. MENO KAMMERHOFF.

Witnesses:
WILLIAM A. HARDY,
MARY J. LAIDLAW.